United States Patent [19]

Baermann

[11] Patent Number: 4,482,034

[45] Date of Patent: Nov. 13, 1984

[54] SWITCHABLE PERMANENT MAGNET BRAKE

[76] Inventor: Max Baermann, Postfach 26, 5060 Bergisch Gladbach 1, Fed. Rep. of Germany

[21] Appl. No.: 434,751

[22] Filed: Oct. 18, 1982

Related U.S. Application Data

[63] Continuation of Ser. No. 172,866, Jul. 28, 1980, abandoned.

[30] Foreign Application Priority Data

Aug. 3, 1979 [DE] Fed. Rep. of Germany ....... 2931539
Sep. 20, 1979 [DE] Fed. Rep. of Germany ....... 2937968

[51] Int. Cl.³ ............................................... B60L 7/28
[52] U.S. Cl. ..................................... 188/165; 105/77; 188/264 A; 192/84 PM; 335/304; 335/306
[58] Field of Search .......... 188/267, 164, 165, 264 A, 188/264 AA; 192/84 PM; 335/288, 302, 304, 306; 105/73, 76, 77, 78

[56] References Cited

U.S. PATENT DOCUMENTS

| 2,209,558 | 7/1940 | Bing et al. ......................... 175/367 |
| 2,243,616 | 5/1941 | Bing et al. ...................... 335/306 X |
| 2,287,286 | 6/1942 | Bing et al. ......................... 335/288 |
| 2,347,023 | 4/1944 | Beechlyn ............................ 335/288 |
| 3,987,873 | 10/1976 | Ruberte ............................. 188/267 |
| 4,055,824 | 10/1977 | Baermann .......................... 335/288 |
| 4,122,922 | 10/1978 | Baermann .......................... 188/267 |
| 4,250,478 | 5/1981 | Cardone et al. ................... 335/288 |

FOREIGN PATENT DOCUMENTS 971096 12/1958 Fed. Rep. of Germany .
721748 1/1955 United Kingdom ............... 188/165

*Primary Examiner*—George E. A. Halvosa
*Attorney, Agent, or Firm*—Body, Vickers & Daniels

[57] ABSTRACT

A switchable permanent magnet eddy current or track brake which has a high density of permanent magnet material, a low internal flux leakage and a higher than heretofore output flux density. The pole shoes of the movable magnets are convex cylindrical segment-shaped and mate with concave cylindrical segment-shaped recesses in the lateral flux return pieces for the fixed magnets.

6 Claims, 7 Drawing Figures

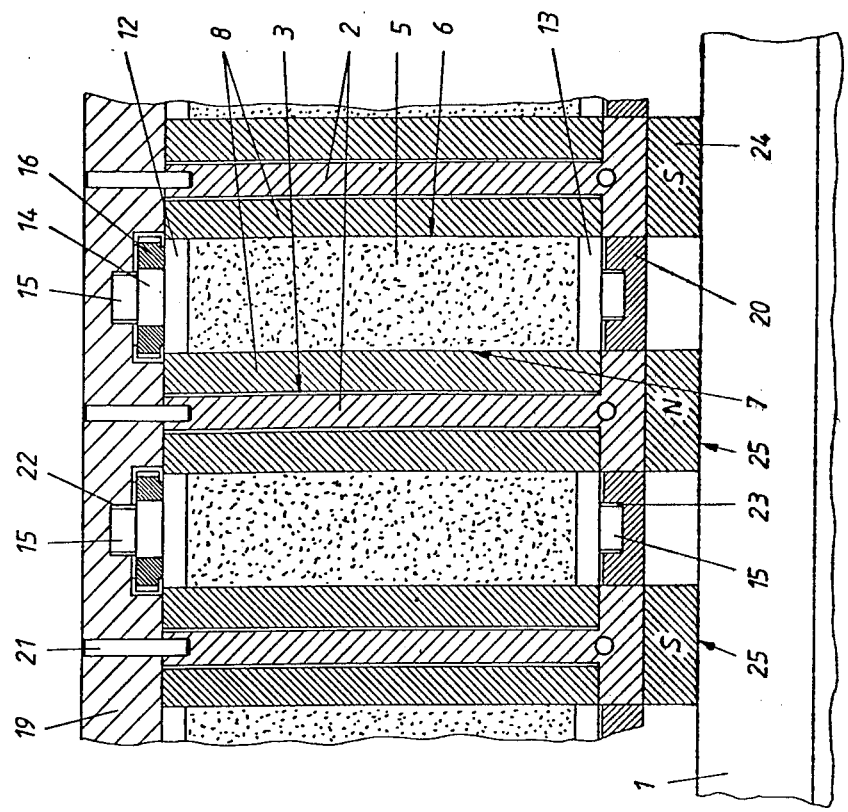
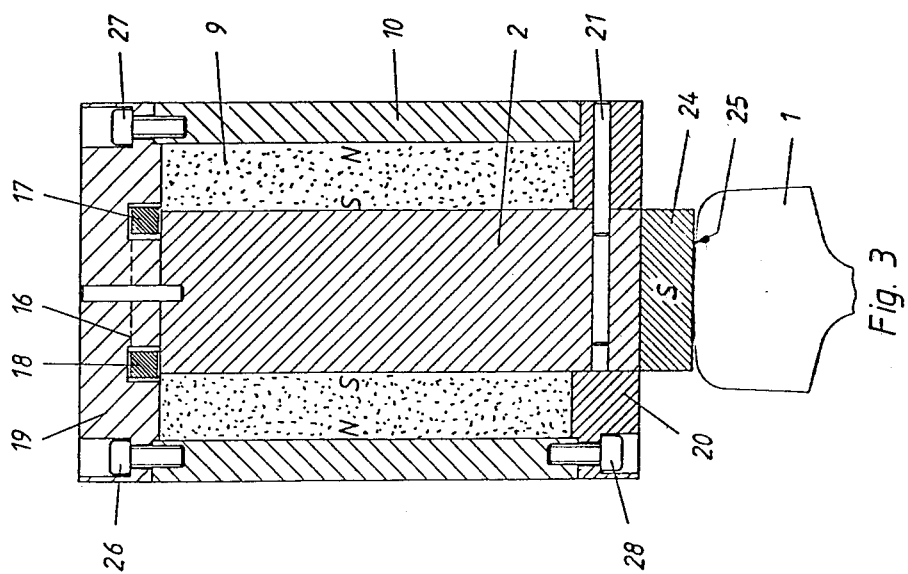
Fig. 2
Fig. 3

SWITCHABLE PERMANENT MAGNET BRAKE

This is a continuation of application Ser. No. 172,866, filed July 28, 1980, now abandoned.

This invention relates to a switchable permanent magnet brake with pole pieces of alternating polarity on which stationary and turnable permanent magnets are positioned. This type of brake could be used for eddy current and/or friction brakes for track-bound vehicles as well as for road vehicles, particularly motor vehicle trailers, with retarders which work according to the eddy current principle.

BACKGROUND OF THE INVENTION

An infinitely variable, permanent magnet eddy current and/or hysteresis brake for track-bound vehicles which has already become known (German Patent No. DT-OS 26 38 133) is provided with pole pieces of alternating polarity in longitudinal direction of the track, on which stationary and turnable cylindrical permanent magnets are positioned. Turning the cylindrical permanent magnets by up to 180° causes the magnetic flux and thus the braking force to be switched on or off and thus controlled.

Although a relatively large volume of permanent magnet material can be accommodated between the pole plates and the pole pieces in this type of brake, the induction on the pole faces and pole piece required for an optimal braking force is not achieved.

THE INVENTION

To overcome the above-referred-to problems and others, it is the object of this invention to improve this known brake, wherein the said magnet material can be used fully, while minimizing leakage, to achieve high braking forces.

This is overcome in the case of the aforementioned brake type in that pairs of stationary permanent magnets are positioned with one pole of each pair on the opposite lateral faces of the pole pieces and the other poles on the lateral flux return plates or flux return rings, and the turnable permanent magnets, magnetized obliquely to the axis of rotation, are provided with cylindrical segment-shaped iron pole shoes on their pole faces which mate with opposite cylindrical segment-shaped recesses in the pole pieces and as such form a permanent magnet system with axes of rotation perpendicular to the surfaces to be braked and with the iron pole shoes being so matched to the cross section of the cylindrical segment-shaped pole shoes that, when switched on, the effective iron cores (pole pieces and segment-shaped pole shoes) produce a closed quadrilateral cross section, and to minimize leakage are surrounded on all sides by permanent magnet material with respectively the same polarity.

The principal advantage of the invention is that all magnetic lines of flux emanating from the pole faces of the turnable magnets are collected by the pole shoes, and due to their segment shape, are directly conducted (while minimizing leakage) to the recessed faces of the pole pieces.

Further, when switched on, the stationary permanent magnets, which lie on the unrecessed pole faces of the pole pieces, contribute to an optimal induction on the pole faces of the brake body by collecting the magnetic lines of flux. Leakage is minimized in that the effective iron cores, which form a closed quadrilateral cross section, are surrounded on all sides by permanent magnet material with respectively same polarity.

Measurements on the invention show that with an air gap of 1 millimeter, an induction of ca. 18,000 G may be achieved with an anisotropic, ferrite permanent magnet material including a barium, strontium or lead metallic oxide. The density of the magnetic lines of flux may be increased by using low carbon ferro-magnetic materials. In comparison, an induction of only approximately 12,000 G in a closed magnetic circuit has been achieved up to now with known permanent magnet brakes.

On turning the cylindrical permanent magnet system by 90° to switch off, the magnetic lines of flux emanating from the poles of the stationary permanent magnets and the turnable permanent magnet systems are short-circuited via the pole shoes, which are in connection with the adjacent pole pieces. One can of course switch off by turning the cylindrical permanent magnet systems by 180°. In this case, the fields are compensated by counter position.

To ensure total switch-off, the volume of magnet material for each turnable magnet system should be measured up to 20% greater than the stationary permanent magnet on each pole piece.

Depending on the intended applications, the brake can be, according to the invention, oblong, ring-shaped, segment-shaped or polygonal. The pole faces of the pole pieces with alternating polarity can be opposite one or both sides of the parts to be braked, in which the eddy currents are induced.

The turnable permanent magnet systems are adjusted via a centrally positioned toothed ring, with toothing on its inner and outer circumference, whereby toothed wheels fixed onto the turnable magnet systems interlock with the inner toothing and the operating members interlock with the outer toothing.

OBJECTS

The principal object of the invention is the provision of a new and improved switchable permanent magnet eddy current or track brake which has a maximum output flux density for a given volume of magnetic material and which can give a maximum braking effort for a minimum volume of permanent magnet material.

Another object of the invention is the provision of a new and improved permanent magnet device of the type described wherein the pole shoes of the movable magnet have a convex cylindrical segment shape and mate with concave cylindrical segment-shaped recesses in the lateral flux return path for the fixed magnets whereby when the device is switched on, there will be minimum internal air gaps in the device and a maximum density of magnetic flux output.

Another object of the invention is the provision of a new and improved device of the type described which has a maximum flux density output and the magnetic flux can be readily internally short-circuited to switch off the braking action.

Another object of the invention is a pole piece-pole shoe arrangement for a switchable permanent magnet brake wherein when the brake is switched on, the pole shoes and pieces form a closed rectangular cross section.

DRAWINGS

The invention may take physical form in certain parts and combinations of parts, preferred embodiments of which will be described in detail in this specification and illustrated in the accompanying drawings which are a part hereof and wherein:

FIG. 2 is a longitudinal, vertically sectional view along line I—I of FIG. 1, partly broken away;

FIG. 3 is a vertical cross section along line II—II of FIG. 1;

PREFERRED EMBODIMENTS

Figure 1:
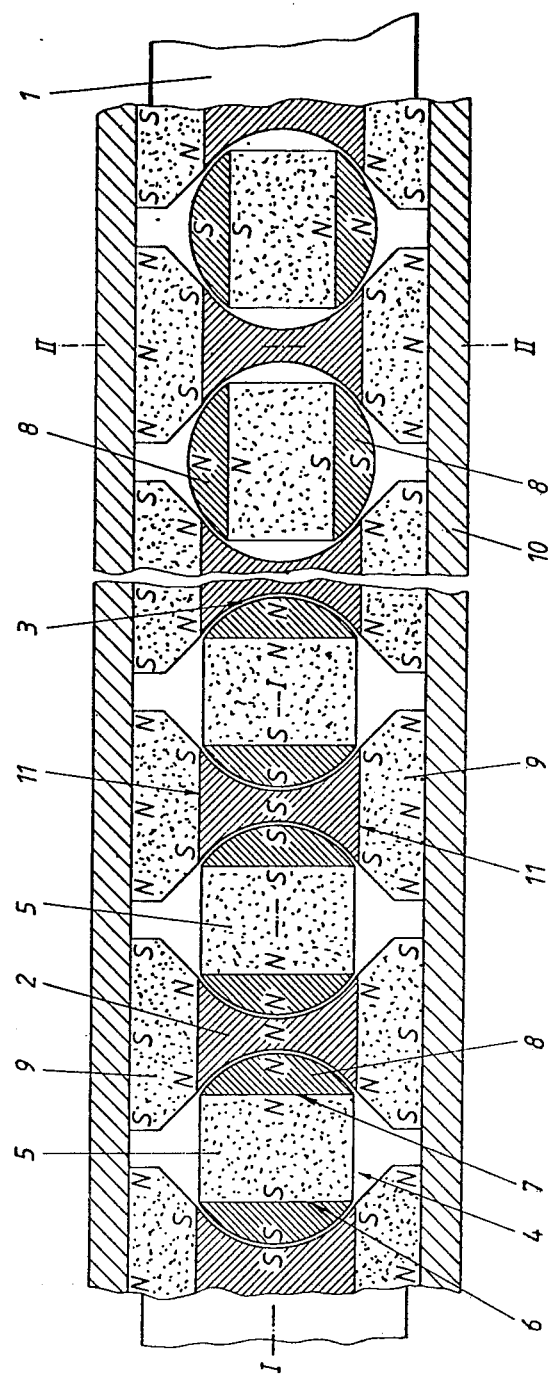
FIG. 1 is a horizontal cross section of FIGS. 2 and 3 of a track brake with some of the magnets in the switched-on and some in the switched-off position illustrating a preferred embodiment of the invention.

Referring now to the drawings wherein the showings are for illustrating preferred embodiments of the invention only and not for the purposes of limiting same, FIG. 1 shows a brake provided with braking or wearing bodies on its pole faces which make it a friction brake. This friction brake is comprised of soft iron pole pieces 2 arranged at spaces lengthwise along the track 1. The opposite faces of the pole pieces in lengthwise direction to the brake have cylindrical segment-shaped recesses 3. The turnable permanent magnet systems 4 project into these recesses with a sliding fit.

The turnable permanent magnet systems 4 are each comprised of one permanent magnet 5, magnetized obliquely to the axis of rotation with the axis perpendicular to the track running surface. The poles of the permanent magnets 5 are marked in the drawing with N and S. Cylindrical segment-shaped iron pole shoes 8 fitted on the pole faces 6, 7 of the magnet 5 project into the segment-shaped recesses 3 of the pole pieces 2. The segment-shaped recesses 3 match exactly the cross section of the segment-shaped pole shoes, producing when switched on, a closed quadrilateral iron cross section.

Stationary permanent magnets 9, magnetized obliquely in the lengthwise direction of the track, are arranged within the brake with one pole positioned on the unrecessed faces 11 of the pole pieces 2 and the counterpole on the insides of flux return plates 10 running lengthwise on the track.

As shown in the drawing marked by the letters N and S, the pole faces of the stationary magnets 9 with alternating polarity on the unrecessed surfaces of the pole pieces 2, are positioned in the direction of motion and thus in the lengthwise direction of the track, so that the pole pieces are alternately premagnetized with a north and a south pole.

The brake in switched-on state is illustrated in the left-hand half of FIG. 1. In this illustration, the cylindrical segment-shaped iron pole shoes 8, showing a north pole, closely mate with the segment-shaped recesses of the pole pieces 2, premagnetized with a north pole, and the opposite segment-shaped pole shoes, showing a south pole, closely mate with the pole pieces premagnetized with a south pole. The respective polarities of the segment-shaped pole shoes and the pole pieces are marked by the letters N or S. In this position, an additional induction increase in the pole pieces 2 occurs due to the turnable, permanent magnet systems. As can be seen from the drawing, the effective iron cores (pole pieces 2 and segment-shaped iron pole shoes 8) are surrounded on all sides by permanent magnets, so that leakage is reduced to a minimum. With this example, the total ferro-magnetic pole surface amounts to 24 cm$^2$ and the induction with an air gap of 1 millimeter amounts to approximately 18,000 G.

Should the brake be switched off, the turnable permanent magnet systems 4, whose axes of rotation are positioned perpendicularly to the track running surface, will be turned by 90°. This position of switching is shown in the right-hand half of FIG. 1. In this position the segment-shaped pole shoes 8 bridge the adjacent pole piece 2 of alternating polarity so that the magnetic lines of flux emanating from the north and south poles of the stationary and turnable permanent magnets short-circuit via the segment-shaped pole shoes.

The brake design is visually recognizable in FIG. 2. In this longitudinal, vertical sectional view along line I—I of FIG. 1 the brake is in the switched-on position, i.e. the segment-shaped pole shoes 8 project into the segment-shaped recess 3 of the pole pieces 2. The segment-shaped iron pole shoes 8, positioned on the pole faces 6, 7 of the turnable permanent magnets, are connected by mounting plates 12, 13 of a non-magnetic material (e.g. with screws). The pole shoes can also be glued to the magnets. The mounting plate 12 of the turnable permanent magnet systems 4 is provided with a pivot 14 and a bearing pin 15. A toothed wheel 16 is mounted on the pivot 14, into which lock contrashifting racks 17, 18 for the purpose of turning the magnet systems 4. The racks 17, 18 running lengthwise along the brake are more easily recognizable in FIG. 3. The racks may be operated for example by mechanical, pneumatic or hydraulic means.

The pole pieces 2 are connected by locking pins 21 to an upper cover plate 19 and a lower cover plate 20 of non-magnetic material, which extend the whole length of the brake. The turnable permanent magnet systems 4 are freely movable in the corresponding bearing bushings 22 of the upper cover plate and respectively, bearing bushing 23 of the lower cover plate, due to bearing pins 15. In this example, braking shoes or wearing parts 24 on the lower pole faces of the pole pieces 2 have been removably fixed with screws, which have not been illustrated. For the purpose of braking, the pole faces 25 of the wearing parts are pressed onto the track by magnetic attraction, the poles of which are marked on the drawing by the letters N and S. Due to the frictional force caused, an effective braking is achieved.

Of course, the aforementioned brake may also be used purely as an eddy current and hysteresis brake, whereby the wearing parts are omitted. In this case, the track running surfaces are opposite the pole faces of the pole pieces 2 showing poles of alternating polarity in the direction of motion of the vehicle.

In the vertical cross section of FIG. 3, a pole piece 2 may be seen, the lateral faces of which are adjacent at one pole to the stationary permanent magnets 9 and at their counterpole adjacent to the flux return plates 10. The upper cover plate 19 and the lower cover plate 20 are fastened by screws 26, 27, 28 to the flux return plates 10, so that the brake forms a completely closed body. From out of the lower cover plate 20 projects the wearing parts 24, respectively, the pole faces 25 of these being opposite the track 1.

Figure 4:
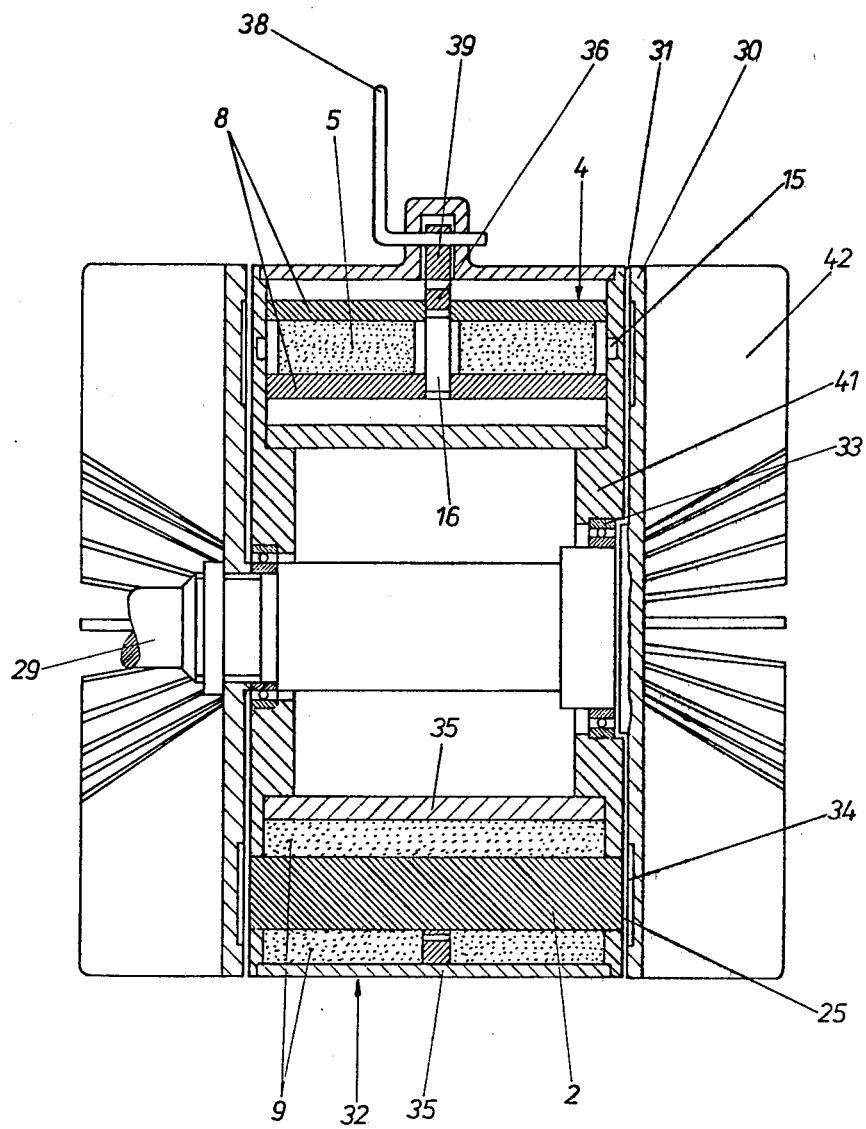
FIG. 4 is a longitudinal section through the axis of an eddy current brake for road vehicles.

According to FIG. 4, on the brake for road vehicles, two brake discs 30 are fixed at spaces on the shaft 29. Between the two disc brakes, separated by air gaps 31, a ring-shaped brake body 32 is positioned with the turnable permanent magnet systems 4 mounted on stationary parts of the vehicle, e.g. chassis, and freely movable on the shaft to be braked by means of ball bearings 33.

The faces of the rotating brake discs facing the pole faces 25 of the brake body 32 are provided with a material of good electrical conductivity 34, e.g. an electroplated layer of copper.

Figure 5:
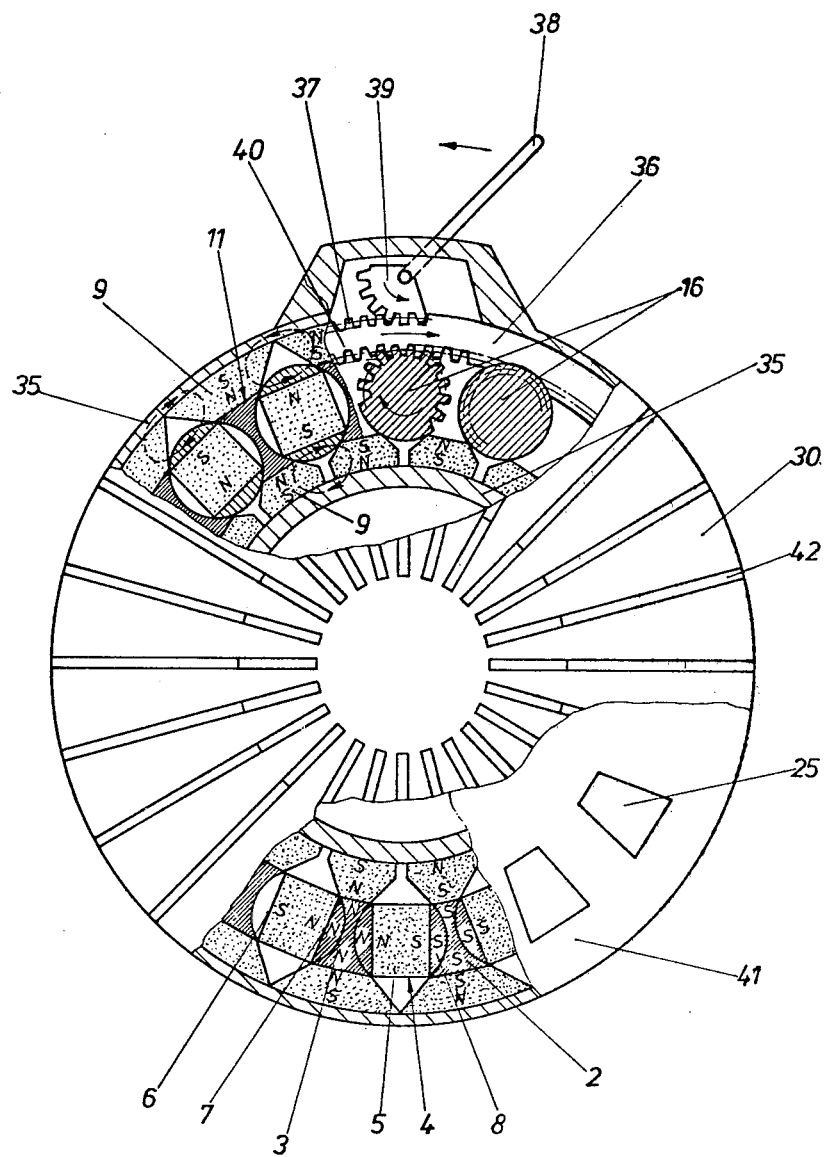
FIG. 5 is a partly cut and broken away view of the brake according to FIG. 4 perpendicular to axle.

The design of the brake body 32 is recognizable in FIG. 5. The stationary positioned brake body 32 is shown in the example in FIG. 5 as being ring-shaped. The pole pieces 2 are made of a ferro-magnetic material of good conductivity and are spaced in annular formation.

The opposite faces of the pole pieces 2 have segment-shaped recesses 3. The turnable permanent magnets 4 project with a sliding fit into these recesses.

The turnable permanent magnet systems 4 are each comprised of one permanent magnet 5, magnetized obliquely to the axis of rotation, which runs perpendicularly to the rotational plane of the eddy current brake discs 30. The poles of the permanent magnets 5 are marked in the drawing with N and S. Cylindrical segment-shaped iron pole shoes 8 are provided on the pole faces 6, 7 of the magnet 5, the said pole shoes 8 projecting into segment-shaped recesses 3 of the said pole pieces 2. The segment-shaped recesses 3 are exactly matched to the cross section of the segment-shaped pole shoes so that when switched on, a closed quadrilateral iron cross section results.

Further, stationary permanent magnets 9 are positioned within the brake body 32, which are magnetized in a radial direction and at one pole adjacent to the unrecessed faces 11 of the pole pieces 2 and at their counterpole, adjacent to the inner, respectively, outer sides of the flux return rings 35.

As marked in the drawing with the letters N and S, the pole faces of the stationary permanent magnets 9 with alternating polarity are positioned on the unrecessed faces of the pole pieces 2, so that the pole pieces are alternately magnetized with a north and a south pole.

The switched-on brake is shown in the lower half of FIG. 5 (partly broken away). In this illustration, the segment-shaped iron pole shoes 8 which show a north pole mate with the segment-shaped recesses of pole pieces 2 magnetized with a north pole, and the opposite segment-shaped pole shoes showing a south pole mate with the pole pieces magnetized with a south pole. The respective polarities of the segment-shaped pole shoes and the pole pieces are marked by the letters N and S. In this position of switching, an additional induction increase in the pole pieces 2 occurs due to the turnable permanent magnet systems 4. As may be seen in the drawing, the effective iron cores (pole pieces 2 and segment-shaped iron pole shoes 8) are surrounded on all sides by permanent magnets, so leakage is reduced to a minimum.

Should the brake be switched off, the turnable permanent magnet systems 4, the axes of rotation being perpendicular to the plane of the illustration, are turned by 90°. This position of switching is shown in the broken-away half of FIG. 5. In this position, the segment-shaped iron pole shoes 8 bridge the adjacent pole piece of alternating polarity so that the magnetic lines of flux emanating from the north and south poles of the stationary and turnable permanent magnets short-circuit via the cylindrical segment-shaped pole shoes so that no magnetic lines of flux emanate from the pole faces 25.

The path of the magnetic lines of flux in the short-circuited state is illustrated in the drawing by broken lines.

The permanent magnet systems 4 are turned from the "off" to the "on" position or vice versa by means of a toothed ring 36 with toothing on its inner and outer circumferences. The toothed, pivoted segment 39, connected to an operating lever 38, interlocks with the outer toothing 37.

The toothing 40 on the inner circumference of the toothed ring 36 interlocks with toothed wheels 16 which are preferably mounted in the middle of the turnable permanent magnet systems 4 as may be seen in FIG. 4.

On operating the lever 38 in the direction of the arrow, the toothed ring 36 is turned by the toothed segment 39 in the direction of the arrow. At the same time, all turnable permanent magnet systems 4 are turned from the "on" to "off" position or in the opposite direction, from the "off" to the "on" position. The operation may follow for example by mechanical, pneumatic or hydraulic means.

The brake body 32 is provided on opposite sides with cover disc 41 made from a magnetic non-conductive material. The discs are provided with recesses in annular formation, matching the cross section of the pole pieces 2. The pole pieces 2 and their pole faces project into these recesses. The turnable magnet systems 4 are freely movable in the cover discs by means of bearing pins 15.

Ventilating wings, respectively, cooling ribs 42 are provided on the outer surface, away from the brake body, of the eddy current brake discs 30 to ensure good cooling and thermal conduction in the brake discs.

Figure 6:
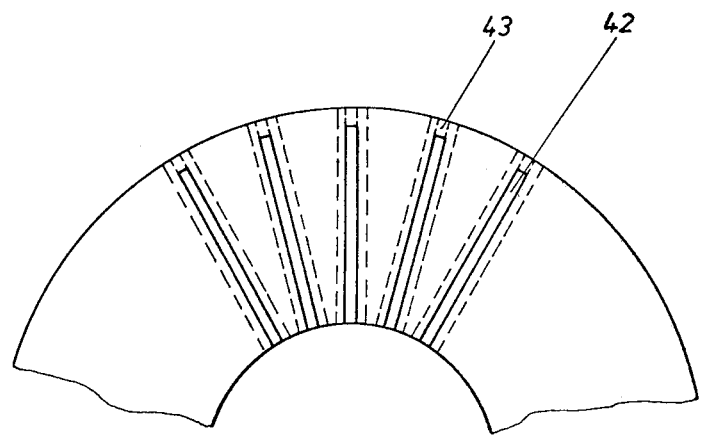
FIG. 6 is a top view of the eddy current brake, partly broken away.
Figure 7:
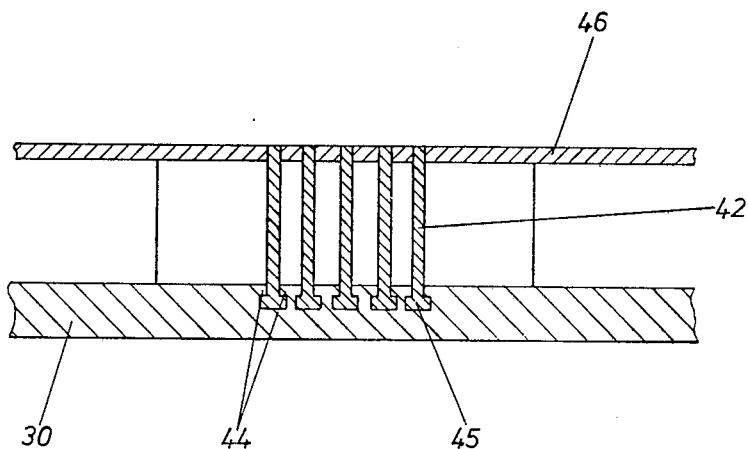
FIG. 7 is a perpendicular section through the eddy current brake disc.

Mounting and fixing the cooling ribs 42 on the outer surface of the eddy current brake discs 30, away from the brake body, follows in the advantageous manner illustrated in FIGS. 6 and 7. The eddy current brake discs are provided with countersunk grooves 43 running in a radial direction. As may be seen in FIG. 7, the grooves produce clamping projections 44, thus forming a T- or swallow-tail-shaped cross section. The ends 45 of the cooling ribs 42 are pushed into the grooves 43, both having a matching cross section. The cooling ribs 42, having been pushed into the grooves 43 of the eddy current brake discs 30, are secured by pressing on the clamping projections 44. The cooling ribs 42 may be connected to each other by means of an air guiding ring 46.

Due to this development, not only is a simple mounting of the cooling ribs 42 on the eddy current brake discs attained, but a particularly good heat dissipation from the eddy current brake discs to the cooling ribs 42 is achieved, due to the large contact surface.

The invention is not restricted to the aforedescribed embodiments. To minimize the leakage still further with embodiments according to FIGS. 1 to 3, further permanent magnets could be provided on the surfaces of the brake away from the pole faces, bringing about a corresponding anti-magnetization.

For the purpose of switching the brake on or off, other adjustment or turning mechanisms, operated by hydraulic or pneumatic means, could be used.

Having thus described my invention, I claim:

1. A switchable permanent magnet brake with pole pieces of alternating magnetic polarity including:

(a) a plurality of pairs of elongated spaced stationary permanent magnets of low permeability with an abutting ferromagnetic pole piece between each pair, the magnets of each pair being magnetized on a transverse axis with the same magnetic polarity facing the intermediate pole piece, said pole piece having the same magnetic polarity as said facing magnetic polarity;

(b) said pairs of magnets and pole pieces being arranged in side by side spaced relationship with alternating magnetic polarity and with flux return members between adjacent pairs;

(c) an elongated permanent magnet of low permeability having a pair of abutting ferromagnetic pole shoes positioned between adjacent pairs of said pole pieces and rotatable about its longitudinal axis and each magnetized on a transverse axis through said pole shoes, the longitudinal ends of said pole pieces and said pole shoes forming pole surfaces;

(d) said pole pieces having oppositely facing cylindrical segment-shaped recesses and said pole shoes being in the shape of cylindrical segments mating with the segment-shaped recesses of said pole pieces;

(e) said rotatable permanent magnet and its pole shoes and the stationary permanent magnets and their pole pieces forming in one position of the rotatable permanent magnet a closed multisided cross-section of ferromagnetic material surrounded on all sides by permanent magnet material of the same magnetic polarity whereby each magnet has a ferromagnetic member in abutting relationship therewith for conducting flux axially to the pole face of said brake with a minimum reluctance.

2. The brake of claim 1 wherein said brake is for use with road vehicles and the magnets are arranged in the shape of at least a ring and eddy current brake discs fixed to the intended braking part of the vehicle are arranged on at least one longitudinal end of the pole and pole pieces with alternating magnetic polarity.

3. A switchable permanent magnet brake with pole pieces of alternating magnetic polarity and including: a plurality of pairs of spaced stationary and a plurality of turnable elongated permanent magnets of low permeability, each one of said pairs of stationary permanent magnets being positioned with one pole face of the same magnetic polarity abutting an opposite lateral face of a pole piece of said same magnetic polarity, the other pole face abutting a lateral flux return member; each of said pole pieces having a cylindrical segment-shaped recess between its respective magnets; said pairs of stationary permanent magnets and pole pieces being arranged in spaced relationship with alternating magnetic polarity; said turnable permanent magnets being rotatable about an axis and magnetized perpendicular to their axis of rotation and each having a pair of cylindrical segment-shaped iron pole shoes abutting their pole faces; said turnable permanent magnets and pole shoes being positioned between said pole pieces with said cylindrical-shaped segment surfaces in close spaced mating relationship as said turnable magnets are turned; said pole pieces and pole shoes forming when the rotatable permanent magnets are rotated to the switched-on position a closed multi-sided cross section surrounded on all sides by permanent magnet material with the same magnetic polarity, the longitudinal end of said pole pieces and pole shoes forming the magnetic poles of said brake.

4. The brake of claim 3 for use with road vehicles wherein said permanent magnets are arranged in the shape of a ring, segment or polygon and eddy current brake discs rotatable with the intended braking part of the vehicle are arranged on one or both sides of the pole faces of the pole pieces with alternating magnetic polarity.

5. The brake of claim 4 wherein both ends of said pole pieces are associated with an eddy current brake disc.

6. The brake of claim 4 wherein said eddy current brake discs are provided on one side facing the pole pieces with a layer of material of good electrical conductivity and on the other side with cooling ribs such as ventilating rings with a high thermal conductivity.

* * * * *